United States Patent [19]

Chiu et al.

[11] Patent Number: 5,670,253

[45] Date of Patent: Sep. 23, 1997

[54] CERAMIC WAFERS AND THIN FILM MAGNETIC HEADS

[75] Inventors: Raymond C. Chiu, Woodbury; Robert G. Smith, Vadnais Heights; Billy Lee Weaver, Eagan, all of Minn.

[73] Assignee: Minnesota Mining and Manufacturing Company, St. Paul, Minn.

[21] Appl. No.: 575,627

[22] Filed: Dec. 20, 1995

[51] Int. Cl.[6] .................................................. G11B 5/03
[52] U.S. Cl. .......................... 428/336; 360/103; 360/122; 428/141; 428/216; 428/334; 428/698; 428/701; 428/702; 501/87; 501/93; 501/127; 501/153
[58] Field of Search .................................... 428/141, 698, 428/701, 702, 334, 336, 216; 501/87, 93, 127, 134, 135, 105, 152; 360/122, 103

[56] References Cited

U.S. PATENT DOCUMENTS

| | | | |
|---|---|---|---|
| 3,816,906 | 6/1974 | Falckenberg | 148/175 |
| 4,356,272 | 10/1982 | Kanemitsu et al. | 501/87 |
| 4,430,440 | 2/1984 | Wada et al. | 501/105 |
| 4,582,812 | 4/1986 | Furukawa et al. | 501/87 |
| 4,650,774 | 3/1987 | Kawaguchi et al. | 501/87 |
| 4,659,606 | 4/1987 | Wada et al. | 428/141 |
| 5,225,032 | 7/1993 | Golecki | 437/100 |
| 5,254,370 | 10/1993 | Nagasawa et al. | 427/255.7 |

FOREIGN PATENT DOCUMENTS

| | | |
|---|---|---|
| 0 137 134 A1 | 4/1985 | European Pat. Off. . |
| 0 515 786 A1 | 12/1992 | European Pat. Off. . |
| 0 582 444 A1 | 2/1994 | European Pat. Off. . |

OTHER PUBLICATIONS

Patent Abstracts of Japan, vol. 16, No. 216 (p. 1356), May 21, 1992 for Japanese Patent Document No. JP,A,04 038707 (published Feb. 7, 1992).

Patent Abstracts of Japan, vol. 13, No. 502 (p. 958), Nov. 13, 1989 for Japanese Patent Document No. JP,A,01 201812 (published Aug. 14, 1989).

Patent Abstract of Japan, vol. 8, No. 65 (p. 263), Mar. 27, 1984 for Japanese Patent Document No. JP,A,58 211316 (published Dec. 8, 1983).

*Primary Examiner*—Archene Turner
*Attorney, Agent, or Firm*—Gary L. Griswold; Walter N. Kirn; Gregory D. Allen

[57] ABSTRACT

A composite ceramic wafer including a beta silicon carbide layer. The composite ceramic wafer is useful for making thin film magnetic heads.

20 Claims, No Drawings

CERAMIC WAFERS AND THIN FILM MAGNETIC HEADS

FIELD OF THE INVENTION

This invention relates to ceramic wafers useful for making thin film magnetic heads, and a method for making the same. The wafer comprises a metal oxide-based substrate with a layer of silicon carbide on a major surface thereof.

DESCRIPTION OF RELATED ART

Thin film magnetic recording heads are made by building thin film devices on a ceramic substrate commonly referred to as a wafer. Common wafer materials include $Al_2O_3$-TiC composites. The alumina/titanium carbide composite materials are generally electrically conductive, and typically comprise about 60–80% by weight $Al_2O_3$, about 20–40% by weight TiC, and up to about 5% by weight other oxide additives (e.g., yttria, magnesia, titania, zirconia, and silica).

Due, for example, to the electrical conductivity and surface characteristics (e.g., surface roughness) of typical wafers, the standard industry practice is to deposit a thick (e.g., 10–20 micrometers), pore-free layer of (non-conductive) amorphous alumina onto the wafer via a sputtering process prior to device manufacture. The amorphous alumina coatings are polished to an average thickness between about 3 to 10 micrometers and an average surface roughness, $R_a$, of at least 5° A.

The amorphous alumina coatings are substantially softer and less wear resistant than the $Al_2O_3$-TiC composite material, and are also relatively easy to machine and polish.

Although adjacent magnetic film layers can help dissipate this localized heat, the thick and poor thermally conductive amorphous alumina coating is a significant thermal barrier and interferes with cooling the electronic device. In addition to poor thermal conductivity, the softness of the sputtered amorphous alumina coatings relative to the ceramic wafer, results in less than desirable wear characteristics near the sensor elements during the finishing step(s) of the magnetic head manufacturing process. This latter phenomenon, which is referred to as pole tip recession (PTR) results in the sensor pole tips being typically recessed from the air bearing surface as much as 8 nanometers, further resulting in significant loss in read and write signal.

A need exists to provide an efficient thermal conductor on the surface of the ceramic wafer that has a surface roughness or finish suitable for building thin film devices thereon, while at the same time allows finishing with minimal PTR.

SUMMARY OF THE INVENTION

The present invention provides a composite ceramic wafer comprising:

(a) a metal oxide-based substrate having a first major surface and an average thickness in the range from about 0.5 to about 5 millimeters; and (b) a polycrystalline beta silicon carbide layer on the first major surface, the beta silicon carbide layer having an average thickness in the range from about 3 to about 20 micrometers and an average surface roughness in the range from about 3 to about 25 Angstroms.

In another aspect, the present invention provides a method for making a composite ceramic wafer, the method comprising the steps of:

(a) chemical vapor depositing a polycrystalline beta silicon carbide layer onto a major surface of a metal oxide-based ceramic substrate, the substrate having an average thickness in the range from about 0.5 to about 5 millimeters and the major surface having an average surface roughness in the range from about 3 to about 25 Angstroms; and (b) polishing the layer such that it has an average thickness in the range from about 3 to about 20 micrometers and an average surface roughness in the range from about 3 to about 25 Angstroms.

In another aspect, the present invention provides a thin film magnetic recording head comprising a metal oxide-based ceramic substrate having a first major surface with a polycrystalline beta silicon carbide layer thereon, the silicon carbide layer having an average thickness in the range from about 3 to about 20 micrometers and a major surface with an average surface roughness in the range from about 3 to about 25 Angstroms; and thin film magnetic device circuitry on said major surface of the silicon carbide layer.

In another aspect, the present invention provides a method for making a thin film magnetic recording head, the method comprising the steps of:

(a) chemical vapor depositing a polycrystalline beta silicon carbide layer onto a major surface of a metal oxide-based ceramic substrate, the major surface having an average surface roughness in the range from about 3 to about 25 Angstroms;

(b) polishing the layer such that it has an average thickness in the range from about 3 to about 20 micrometers and an average surface roughness in the range from about 3 to about 25 Angstroms;

(c) depositing thin film magnetic device circuitry on the major surface of the silicon carbide layer; and (d) converting the wafer resulting from step (c) to at least one thin film magnetic recording head.

A second major surface opposite to the first surface of the substrate can also have a coating or layer of beta silicon carbide. Preferably, the average surface roughness of the second major surface is in the range from about 25 to about 1000 nanometers. The second silicon carbide layer preferably has an average thickness in the range from about 3 to about 20 micrometers and an average surface roughness in the range from about 3 to about 50 Angstroms.

In this application:

"substrate" (sometimes referred to in the art as a wafer) refers to a ceramic substrate that is suitable as the support onto which circuitry commonly referred to in the art as "thin film circuitry" is deposited to make electromagnetic and/or magnetoresistive devices such as magnetic recording heads;

"metal oxide-based" material refers to material comprising means at least 50 by weight metal oxide;

"beta silicon carbide" refers to the cubic phase of silicon carbide;

"alumina" in the context of alumina substrate refers to a substrate comprising, on a theoretical oxide basis, at least 50 percent by weight $Al_2O_3$;

"zirconia" in the context of zirconia substrate refers to a substrate comprising, on a theoretical oxide basis, at least 50 percent by weight $ZrO_2$;

"$Al_2O_3$-TiC" in the context of an $Al_2O_3$-TiC substrate refers to a substrate comprising, on a theoretical oxide basis, $Al_2O_3$ in the range from 60 to 95 percent by weight, and TiC in the range from 40 to 5 percent by weight, wherein alumina and titanium carbide are each present as discrete grains;

"$Al_2O_3$-SiC" in the context of an $Al_2O_3$-SiC substrate refers to a substrate comprising, on a theoretical oxide basis, $Al_2O_3$ in the range from 60 to 98 percent by weight, and SiC in the range from 40 to 2 percent by weight, wherein alumina and silicon carbide are each present as discrete grains; and "thin film magnetic head" refers to an individual circuit element or combinations of elements sliced and machined from the beta silicon carbide coated substrate having thin film magnetic circuitry thereon.

The coated wafer according to the present invention maintains desirable attributes of the substrate (wafer) (i.e., diceability, machineability, and polishability).

DESCRIPTION OF PREFERRED EMBODIMENTS

The substrate typically is dense (generally at least 99.9% of theoretical), hard, wear resistant, polishable to a fine finish (i.e., generally to an average surface roughness, $R_a$, of less than about 25° A), and resistant to chipping and cracking.

The metal oxide -based substrates, which are generally crystalline ceramics, typically have an average thickness in the range from about 0.5 millimeter to about 5 millimeters; preferably from about 1 to about 3 millimeters. They can be obtained or made in a variety of sizes and shapes. Common sizes and shapes include squares (e.g., 10.2 cm (4 inch)×10.2 cm (4 inch) squares) and discs (e.g., 7.6 cm (3 inch) to 12.5 cm (4.92 inch) discs). The size, shape and thickness of the substrate is determined, for example, by the process used to make the substrate and the process used to make the magnetic heads.

The surface to be coated with the silicon carbide preferably has an average surface roughness in the range from about 25 to about 1000 nanometers; more preferably in the range from about 100 to about 500 nanometers. It is believed that an average surface roughness greater than about 25 nanometers assists in providing better adhesion of the silicon carbide layer to the substrate as compared to lower surface roughnesses. If the surface roughness is too low, there tends to be insufficient bonding or adherence of the silicon carbide coating or layer to the substrate for practical use of the composite wafer.

Suitable substrates include alumina substrates, zirconia substrates, $Al_2O_3$-TiC substrates, and $Al_2O_3$-SiC substrates. The substrates may include (preferably up to 5% by weight) additives such as grain growth inhibitors, sintering aids, and machineability enhancement agents. The additives may function as a grain growth inhibitor, a sintering aid and/or a machineability enhancement agent. The amount of each additive may vary depending, for example, on which particular additive(s) is used, which effect(s) is desired, and what level of effect(s) is desired.

Grain growth inhibitors are generally inorganic materials or precursors thereof that serve to inhibit microstructural coarsening which tends to occur during the sintering or firing step of the typical substrate manufacturing process. Common grain growth inhibitors and sintering aids include magnesium oxide (MgO), silica ($SiO_2$), titania ($TiO_2$), calcia (CaO), baria (BaO), yttria ($Y_2O_3$) and ceria ($Ce_2O_3$). Machineability agents are added to optimize the cutting and lapping rates during head fabrication. It is believed such additives lower the bond strength between grains in the substrate. Typical machineability agents include zirconia ($ZrO_2$), calcia, baria, yttria, and ceria.

The substrates preferably have a density of at least 99.9% of theoretical.

An alumina substrate comprises, on a theoretical oxide basis, at least 50 percent by weight, (preferably at least 95 percent by weight; more preferably at least 99 percent by weight; even more preferably at least 99.9 percent by weight) $Al_2O_3$, based on the total weight of the substrate. Additional metal oxides which may be present in the alumina substrate include magnesium oxide, iron oxide, silica, zirconia, titania, lanthanum oxide, yttria, and combinations thereof. One preferred alumina substrate comprises, on a theoretical oxide basis, about 99.9 percent by weight $Al_2O_3$, and about 0.1 percent by weight MgO. Preferably, the average grain size of the material making the substrate is less than 2.5 micrometers. More preferably the average grain size is about 0.7–1.1 micrometer.

A zirconia substrate comprises, on a theoretical oxide basis, at least 50% by weight (preferably at least 85%, more preferably, at least 88%, by weight) $ZrO_2$. Additional metal oxides which may be present in the alumina substrate include yttria, cerium oxide, magnesium oxide, and calcium oxide. Preferably, such metal oxides are present in an amount of less than 12% by weight.

The $Al_2O_3$ to TiC ratio in the $Al_2O_3$-TiC compositions typically ranges from 95:5 to 60:40 by weight. In another aspect, $Al_2O_3$-TiC substrates preferably comprise, on a theoretical oxide basis, in the range from 65 to 95 percent by weight $Al_2O_3$ and in the range from 35 to 5 percent by weight TiC. Other oxides which may be present in the $Al_2O_3$-TiC substrate include yttria, silica, titanium oxide, magnesium oxide. Preferably such oxides are present in an amount of less than 5% by weight.

Suitable $Al_2O_3$-TiC substrates are commercially available, for example, under the trade designation "TF-400" from Kyocera Corp. of Kyoto, Japan; "AC2" from Sumitomo Special Metals of Osaka, Japan; and "3M-210 ALUMINA-TITANIUM CARBIDE" and "3M-310 ALUMINA-TITANIUM CARBIDE" from the 3M Company of St. Paul, Minn.

The 3M Company materials ("210" and "310") comprise, on a theoretical oxide basis, up to 65 by weight $Al_2O_3$ and up to 35 percent by weight TiC, and less than 5 about percent by weight MgO, $SiO_2$, $Y_2O_3$, and $TiO_2$. The average grain size of the 3M Company materials ("210" and "310") are about 1.5 micrometer and about 0.9 micrometer, respectively. They each have a density of at least 99.9% of theoretical. Further, these two substrate materials are electrically conductive, and have good surface stability, tensile strength, and machineability characteristics.

An $Al_2O_3$-SiC substrate preferably comprises on a theoretical oxide basis, at least 60% by weight $Al_2O_3$ and at least 2% by weight SiC; more preferably at least 80% by weight $Al_2O_3$ and at least 20% by weight SiC. Other oxides that may be present in the $Al_2O_3$-SiC substrate include yttria, lanthanum oxide, magnesium oxide, calcia, and silica.

The silicon carbide can be coated onto the substrate (or wafer) by pyrolytic decomposition of gaseous phase SiC precursors. Preferably, a substrate(s) is positioned in a chemical vapor deposition (CVD) furnace such that both major surfaces of the substrate are coated with silicon carbide. For example, the substrate surface to be coated preferably is parallel to the stream of reactive gases. Suitable precursors include dimethyldichlorosilane (DDS) and methyltrichlorosilane (MTS). The silicon carbide may be deposited at conventional CVD temperatures associated with such deposition of silicon carbide (e.g., temperatures ranging from about 800° C. to about 1200° C.). With regard to the use of DDS as the silicon carbide precursor, for maximum deposition efficiency, and for stoichiometric SiC, deposition is conducted at temperatures ranging from about 900° C. to about 975° C. For the MTS precursor, deposition is preferably conducted at a temperature ranging from 965° C. to 1150° C.

For DDS, deposition temperatures below about 900° C. may result in an increased carbon content in the layer. Deposition with MTS at temperatures below about 965° C. may result in a silicon rich layer.

The deposition time is dependent, for example, on the particular reactive gases, the reactive gas flow rate, the ratio of reactive gas to hydrogen, the deposition temperature, and the desired layer thickness.

The reaction parameters for particular CVD layer arrangements, including the use of various silicon carbide precursors (e.g., DDS, MTS, and combinations thereof), can be adjusted and optimized by those skilled in the art.

Generally, the as deposited silicon carbide has an average thickness in the range from about 10 to about 50 micrometers; preferably about 15 to about 35 micrometer; and more preferably about 25 micrometers. The silicon carbide layer is generally beta-silicon carbide. This form of silicon carbide has a cubic crystal structure. Preferably the silicon carbide layer has a density at least 99.9% of theoretical density.

Preferably, the silicon carbide layer is capable of being polished to an average surface roughness of less than about 5° A, has a high thermal conductivity (at least about 200 watts/mK) as compared to an amorphous alumina (about 0.5 watt/mK) layer, and is harder than conventional amorphous alumina coatings used on such substrates.

Further, the silicon carbide layer is preferably substantially free from defects such as internal porosity and asperities on the surface of the layer. Internal porosity, which usually cannot be removed by polishing, is believed caused by rapid grain growth during the deposition process resulting in trapped gases in the layer. Asperities are believed to be result from debris in the coating system. Such defects may be avoided or minimized through control of the temperature, maintenance of the system to avoid debris, uniform gas flow, and good mixing of reactive gases, as will be understood by one skilled in the art.

The as deposited silicon carbide is typically polished to an average thickness in the range from about 2 to about 20 micrometers (preferably less than about 15 micrometers; more preferably about 3 to 10 micrometers), and an average surface roughness in the range from about 3 to about 25° A (preferably, about 3 to about 10° A).

Silicon carbide is a semiconductor, and may not provide sufficient electrical isolation for some devices with which the coated substrate may be used. In such cases, it may be desirable to apply (e.g., by sputter coating, chemical vapor deposition, sol gel, or thermal treatment techniques) an insulating layer of, for example, diamond-like carbon, alumina, silicon nitride, or silica over the silicon carbide layer. Typically, it is desirable to keep such insulating layers as thin as possible while maintaining the desired level of electrical isolation. Generally such insulating layers will range in average thickness from about 500° A to about 1500° A.

Thin film magnetic recording devices can be fabricated, for example, onto the composite wafer (that includes the silicon carbide layer) using conventional techniques. For example, such devices are typically fabricated onto an $Al_2O_3$-TiC wafer via a combination of sputter deposition, vapor deposition, electroplating, and photolithography. A typical wafer can be used to fabricate several thousand device elements.

Following thin film device manufacture, the ceramic wafer is sliced and diced into individual device or slider elements via conventional techniques such as high speed diamond saw machining, or nontraditional machining techniques such as ion beam etching, reactive ion etching, and laser ablation. For traditional machining, a high cutting rate with minimal amount of chipping is desirable. For nontraditional machining techniques, the chemical purity and phase chemistries are tailored to enable fast and uniform etching.

The surface of the wafer that comes into contact with the magnetic media is polished to a fine and precise finish, therefore, it is preferable that the material to be polished is essentially free from internal porosity and polishable to a fine finish.

The thin film circuitry of a magnetic head may contain a transducer element and/or a magnetoresistive (MR) sensor read element. A transducer element can read data from recorded magnetic media by sensing changes in magnetic fluxes via induced voltages. Alternatively, a transducer can write data onto magnetic media by imposing magnetic fluxes via applied voltages.

An MR element, on the other hand, can be used to sense variations in the magnetic field by measuring its resistance changes. The latter can be done, for example, by passing a current through the element and measuring the voltage across the element, or by placing a voltage across the element and measuring the change in current. In either case, the sense current generates a considerable amount of heat in the MR element. The need to dissipate this heat often limits the performance of the device. The beta silicon carbide layer present in the wafer according to the present invention not only provides a desirable thermal conductivity but also a high hardness compared to the conventional amorphous alumina coatings.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

This example illustrates the preparation of $Al_2O_3$-TiC wafers coated with silicon carbide.

Two $Al_2O_3$-TiC wafers (12.5 cm (4.92 inch) diameter; commercially available under the trade designation "3M 310" from the 3M Company of St. Paul, Minn.) which had a "lapped" surface (also known as a matte finish) and an average surface roughness, $R_a$, (as measured by a stylus profilometer; available under the trade designation "TENCOR MODEL P2" from Tencor Instruments of Mountainview, Calif.) of about 200 nanometers were cleaned by wiping them with a tissue saturated in deionized water, followed by sequential rinses with water, ethanol, and acetone. The cleaned wafers were then air dried for 2 minutes.

Next, the wafers were placed on a stainless steel (available under the trade designation "INCONEL") fixture which held them about 10 cm (4 in.) apart, parallel to each other, and positioned in a conventional induction heated quartz chemical vapor deposition furnace such that both major surfaces of each wafer to be coated were parallel to the gas stream. The furnace was 20.3 cm (8 in.) in diameter, 61 cm (2 feet) long, and lined with a graphite susceptor.

Hydrogen gas flowed through the quartz furnace at a total pressure of 5 Torr (666.5 Pa), while the furnace was induction heated to about 925° C. according to the following heating schedule:

room temperature →900° C. @5° C./minute; and

900° C. →925° C. @1° C./minute.

At about 925° C., a portion of the hydrogen gas (at a flow rate of about 0.93 standard liters per minute (slm)) was diverted into a bubbler containing dimethyldichlorosilane (DDS) (commercially available from PCR of Gainesville, Fla.). The flow rate of the DDS, carried by hydrogen gas, was about 0.51 slm. That is, hydrogen flowed through the DDS and then into the chamber, as well as directly into the chamber. The total hydrogen flow rate was about 2.03 slm. The hydrogen to DDS ratio, by volume, was about 4.06. By-products and unreacted gases exited at the end of the tube opposite that into which the precursor was introduced. The exit gas flowed through the vacuum pumping system and then through a scrubbing system. The pressure within the quartz tube during the reaction of the silicon carbide precursor was about 5 Torr (666.5 Pa).

The coating of silicon carbide was continued at 925° C. for 2 hours, after which the flow of hydrogen gas through the DDS was stopped. While hydrogen gas continued to flow through the furnace, the temperature was lowered to 900° C. at a rate of 1° C./minute and from 900° C. to 600° C. at a rate of 5° C./minute. The power was then turned off and the furnace allowed to cool overnight to room temperature. During cooling from 900° C. to 500° C., hydrogen continued to flow through the furnace. When the furnace had cooled to 500° C., the hydrogen gas was turned off and the furnace backfilled with argon at a pressure of 600 torr (0.079 MPa).

The coated surfaces of the wafers, as examined at 30x using optical microscopy were consistent with the appearance of typical chemical vapor deposition coatings. The thickness of the silicon carbide coating, as determined using optical microscopy of wafer cross-sections, ranged from about 20–25 micrometers.

The silicon carbide coatings were polished using a 71 cm (28 inch) diameter single-side polisher (available from Hyprez Division, Engis Corporation of Wheeling, Ill.), fitted with a polyurethane pad (Type IC 60 from Rodel of Scottsdale, Ariz.). The coatings were polished for 1 hour with a 5 micrometer diamond polishing slurry (available from Engis of Wheeling, Ill.), and for 20 minutes with a 0.25 micrometer diamond slurry (available from Engis). The polisher was run at 55 rpm. The polished coatings had an average surface roughness of less than about 5° A.

Dark field optical examination of the polished wafers at 200x indicated the coatings were substantially free of internal porosity.

X-ray diffraction (XRD) analysis of the coatings identified beta-silicon carbide. Further, a trace amount of chlorine near the coating-substrate interface was detected when a cross-section of the wafer was examined using scanning electron microscopy (SEM) and energy dispersive analysis (EDX). EDX also indicated that the majority of defects in the coatings were carbon-based. It is believed these defects were due to reaction by-products or debris from the coating process. Further, one surface defect was found which contained aluminum and titanium.

EXAMPLE 2

Six $Al_2O_3$-TiC wafers ("3M 310"), 7.62 cm (3 inches) in diameter, were loaded into a stainless steel fixture and held about 1 cm apart, parallel to each other, and positioned in the furnace as described in Example 1. The wafers were coated with silicon carbide as described in Example 1 except that the coating time was 3 hours. The resulting silicon carbide coatings were substantially thicker at the upstream gas end (i.e., where the gaseous reactants first impinge on the wafer), ranging on one wafer from about 7 to about 19 micrometers. To provide a more uniform coating, it is believed that the wafers should be positioned (e.g., held far enough apart) to allow for complete mixing of the reactive gases.

Comparative Example A

This example illustrates silicon carbide deposition on an $Al_2O_3$-TiC wafer having an average surface roughness of less than about 25° A.

Two 12.7 cm (5 in) diameter $Al_2O_3$-TiC wafers ("3M 310") were coated as described in Example 1 except the coating time was 6 hours.

The thickness of the silicon carbide coating on both wafers was about 75 micrometers. The coatings, however, delaminated from the substrate and were not suitable for conventional polishing or machining.

Comparative Example B

This example illustrates the preparation of a relatively thick silicon carbide coating on an $Al_2O_3$-TiC wafer having an average surface roughness of about 200 nanometers.

Two 12.7 cm (5 inch) diameter $Al_2O_3$-TiC wafers ("3M 310") were coated as described in Example 1 except the coating time was 6 hours and the heating schedule:

room temperature →400° C. @40° C./minute;

400° C. hold for 10 minutes; and

400° C. →925° C. at 17° C./minute. Further, the furnace was cooled as described in Example 1.

The resulting coating was approximately 50 micrometers thick. The coated wafer had poor machineability (i.e., it fractured severely when subjected to high speed diamond dicing). When the coated wafer was dropped about 106.7 cm (3.5 feet) onto a hard, linoleum floor, it shattered in a manner similar to the shattering of tempered glass, thereby indicating the presence of severe compressive stresses. Such compressive stress is believed to be result from the difference thermal expansion coefficients of the silicon carbide and the $A_2O_3$-TiC composition. An uncoated $Al_2O_3$-TiC wafer, dropped from the same height, remained intact.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composite ceramic wafer comprising:
   (a) a metal oxide-based substrate having a first major surface and an average thickness in the range from about 0.5 to about 5 millimeters; and
   (b) a polycrystalline, beta silicon carbide layer on said first major surface, said beta silicon carbide layer having an average thickness in the range from about 3 to about 20 micrometers and an average surface roughness in the range from about 3 to about 25 Angstroms.

2. The wafer according to claim 1 wherein said substrate has a second major surface opposite to said first major surface, and a beta silicon carbide layer thereon having an average thickness in the range from about 3 to about 20 micrometers and an average surface roughness in the range from about 3 to about 50 Angstroms.

3. The wafer according to claim 1 wherein said first major surface has an average surface roughness in the range from about 25 to about 1000 nanometers.

4. The wafer according to claim 3 wherein said substrate is selected from the group consisting of an alumina substrate, a zirconia substrate, an $Al_2O_3$-TiC substrate, and an $Al_2O_3$-SiC substrate.

5. The wafer according to claim 4 wherein said substrate has at least 99.9 percent of theoretical density.

6. The wafer according to claim 3 wherein said substrate is an alumina substrate comprising $Al_2O_3$ in the range from about 95 to about 99.9 percent by weight, and MgO in the range from about 5 to about 0.1 percent by weight, based on the total weight of said substrate.

7. The wafer according to claim 6 wherein said substrate has at least 99.9 percent of theoretical density.

8. The wafer according to claim 3 wherein said substrate is an $Al_2O_3$-TiC substrate comprising $Al_2O_3$ in the range from 60 to 95 percent by weight, and TiC in the range from 40 to 5 percent by weight, based on the total weight of said substrate.

9. The wafer according to claim 8 wherein said substrate has at least 99.9 percent of theoretical density.

10. The wafer according to claim 3 wherein said substrate is an $Al_2O_3$-SiC substrate comprising $Al_2O_3$ in the range from about 60 to about 98 percent by weight, and SiC in the range from about 40 to about 2 percent by weight, based on the total weight of said substrate.

11. The wafer according to claim 3 wherein said layer has at least 99.9 percent of theoretical density.

12. The wafer according to claim 3 wherein said substrate has at least 99.9 percent of theoretical density.

13. The wafer according to claim 3 wherein said layer has an average thickness in the range from about 3 to about 10 micrometers.

14. The wafer according to claim 3 wherein said first major surface has an average surface roughness in the range from about 50 to about 500 nanometers.

15. The wafer according to claim 3 wherein said layer has an average thickness in the range from about 1 to about 3 micrometers.

16. The wafer according to claim 3 wherein said layer has an average surface roughness in the range from about 3 to about 10 Angstroms.

17. A thin film magnetic recording head comprising said wafer according to claim 3 and thin film magnetic device circuitry on said silicon carbide layer.

18. A thin film magnetic recording head comprising a metal oxide-based ceramic substrate having a first major surface with a polycrystalline, beta silicon carbide layer thereon, said silicon carbide layer having an average thickness in the range from about 3 to about 20 micrometers and a major surface with an average surface roughness in the range from about 3 to about 25 Angstroms; and thin film magnetic device circuitry on said major surface of said silicon carbide layer.

19. The thin film magnetic recording head according to claim 18 wherein said substrate has an average thickness in the range from about 0.5 to about 5 millimeters.

20. The thin film magnetic recording head according to claim 18 wherein said first major surface has an average surface roughness in the range from about 3 to about 25 Angstroms.

* * * * *